E. JORDAN.
MEANS FOR COOLING A GAS.
APPLICATION FILED APR. 17, 1922.
1,425,019.
Patented Aug. 8, 1922.
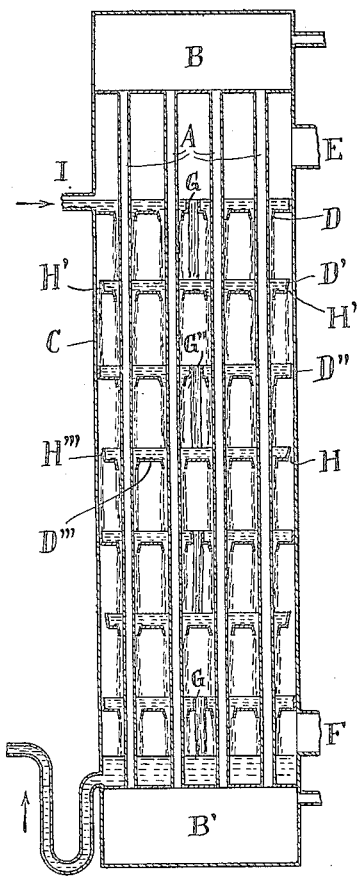
Eugene Jordan INVENTOR
BY
Pennie Davis Marvin & Edmonds
his ATTORNEYS

UNITED STATES PATENT OFFICE.

EUGÈNE JORDAN, OF FRANCONVILLE, FRANCE, ASSIGNOR TO SOCIETE L'AIR LIQUIDE (SOCIETE ANONYME POUR L'ETUDE ET L'EXPLOITATION DES PROCEDES GEORGES CLAUDE), OF PARIS, FRANCE.

MEANS FOR COOLING A GAS.

1,425,019.  Specification of Letters Patent.  Patented Aug. 8, 1922.

Application filed April 17, 1922. Serial No. 554,176.

*To all whom it may concern:*

Be it known that I, EUGÈNE JORDAN, citizen of the Republic of France, and resident of Franconville, France, have invented a new and useful Means for Cooling a Gas, which improvements are fully set forth in the following specification.

This invention relates to an apparatus for transferring heat between currents of gases, and has for its primary object the improvement of the efficiency of such apparatus.

A further object of the invention is the provision of an apparatus for utilizing the evaporation of a liquid as a medium of transfer of heat between the gases.

The apparatus described herein depends upon the utilization of a flowing sheet or film of liquid which is interposed between a heat-conducting wall on one side of which the gas to be cooled circulates and the gas by contact with which the liquid is evaporated. The sheet of liquid which is cooled by evaporation at its surface in contact with the gas which is undergoing saturation with the vapors of the liquid cools, in its turn and simultaneously by direct contact, the wall above referred to and consequently the gas to be cooled flowing on the other side of the wall.

The coefficient of transmission of heat between the surface of a wall and a liquid which moistens it, being higher than between the same surface and a gas which contacts with it, the necessary surface for transmitting the same quantity of heat will be less when the liquid, the evaporation of which in the gas in course of saturation produces a lowering of temperature, moistens the surface, than when the gas in progress of saturation is in direct contact with the surface of the wall across which the transfer of heat is to be made.

The gas to be cooled and the cooling gas in course of saturation circulate in inverse directions. The latter gas, being continually in contact with the saturated liquid, can absorb increasing quantities of the vapor of this liquid as its temperature rises, and consequently leaves the apparatus saturated and at a temperature in the neighborhood of the temperature at which the gas to be cooled enters, thus removing from this gas the greatest quantity of heat which is possible with an apparatus of given dimensions.

The liquid may be caused to circulate in any suitable manner, but from a practical standpoint it is more convenient to circulate it by gravity, observing known precautions to avoid freezing because of the low temperature in the apparatus.

I have illustrated the preferred form of apparatus in the accompanying drawing, in which Fig. 1 is a diagrammatic illustration of one form of apparatus.

The apparatus illustrated in Fig. 1 consists essentially of a plurality of vertical tubes A terminating in two chambers B, B' and enclosed in a shell C. The tubes are surrounded by a plurality of baffle plates or trays D, D', D'', etc., having openings therein of slightly larger diameter than the external diameter of the tubes A. The plates are alternately of substantially equal diameter with the shell C and of slightly less diameter, the former plates having central openings G, G''.

The gas to be cooled enters, for example, the lower chamber B' and travels upwardly in the tubes A to the upper chamber B from which it is discharged. The gas which is to be saturated enters at E near the upper part of the shell C and leaves at F near the bottom of the shell, after having traversed the plates D, D', etc., alternately through the central openings G, G'' and about the peripheries H', H''' of the smaller plates. A tube I permits the introduction near the upper part of the shell C of a current of liquid which is introduced at a substantially uniform rate by suitable means (not shown) and spreads out over the upper plate D.

The openings in the plates for the passage of the tubes being slightly greater in diameter than the exterior diameter of the tubes, the liquid falls through annular spaces thus left free and descends along each tube. The travel of the liquid across the second plate D' helps to maintain it in contact with each of the tubes and insures the provision of the sheet of liquid which has been previously referred to. Another part of the liquid passes from one plate to the other over the ledges provided at the peripheries of the plates. Arriving at the bottom of the tubes, the liquid is collected and leaves the shell C by suitable means, assuring, for example, a certain level of the liquid in this part of the apparatus.

The present invention may be applied, for example, to the cooling of a gas such as air, intended to be liquefied or separated into its elements by liquefaction, the gas which becomes saturated with water, for example, being the dry gas or gases resulting from the liquefaction and separation of the air. This dry gas enters the apparatus at a temperature lower than that of the surrounding atmosphere at which the compressed air enters. If the lowest temperature in the apparatus is much lower than 0° C., it will be necessary to mix a little glycerine with the water which enters at substantially the temperature of the surrounding atmosphere in order to avoid freezing.

The dry gas entering the apparatus saturates itself by contact with the water contained in the bottom of the apparatus and flowing therethrough. It passes through the apparatus in an inverse direction to the direction of the compressed air which circulates in the interior of the tubes. In its travel, it comes in contact with further quantities of water and consequently remains constantly saturated while the temperature increases little by little. This saturated water becomes, moreover, warmer and warmer in proportion as the gas approaches the outlet, which it leaves saturated with water vapor and at the temperature in the neighborhood of the surrounding atmosphere.

I claim:

1. In a heat interchanger, the combination of a shell having chambers at its opposite ends, a plurality of tubes extending through the shell and communicating with the chambers, one of the chambers having an inlet and the other an outlet for a gas to be cooled, an inlet to and an outlet from the shell for the cooling gas, a plurality of trays disposed one above the other within the shell and having openings to receive the tubes, these openings being of slightly greater diameter than the tubes, and means for introducing liquid to the shell above the trays and for withdrawing the liquid below the trays.

2. In a heat interchanger, the combination of a shell having chambers at its opposite ends, a plurality of tubes extending through the shell and communicating with the chambers, one of the chambers having an inlet and the other an outlet for a gas to be cooled, an inlet to and an outlet from the shell for the cooling gas, a plurality of trays disposed one above the other within the shell and having openings to receive the tubes, these openings being of slightly greater diameter than the tubes, and means for introducing liquid to the shell above the trays and for withdrawing the liquid below the trays, the diameter of the alternate trays being respectively substantially equal to and slightly less than the internal diameter of the shell.

In testimony whereof I have signed this specification.

EUGENE JORDAN.